(12) United States Patent
Agatone et al.

(10) Patent No.: US 12,126,630 B2
(45) Date of Patent: Oct. 22, 2024

(54) SYSTEMS, METHODS, AND DEVICES FOR IMPLEMENTING SECURITY OPERATIONS IN A SECURITY PLATFORM

(71) Applicant: PATHLOCK INC., Dallas, TX (US)

(72) Inventors: Kevin Agatone, Dallas, TX (US); Greg Wendt, Dallas, TX (US)

(73) Assignee: PATHLOCK INC., Dallas, TX (US)

( * ) Notice: Subject to any disclaimer, the term of this patent is extended or adjusted under 35 U.S.C. 154(b) by 82 days.

(21) Appl. No.: 17/073,893

(22) Filed: Oct. 19, 2020

(65) Prior Publication Data

US 2022/0124104 A1    Apr. 21, 2022

(51) Int. Cl.
*H04L 9/40* (2022.01)

(52) U.S. Cl.
CPC ................ *H04L 63/1416* (2013.01)

(58) Field of Classification Search
CPC ........... H04L 2463/121; H04L 63/1416; H04L 63/1408; H04L 63/1425; H04L 63/1433; H04L 1/00
See application file for complete search history.

(56) References Cited

U.S. PATENT DOCUMENTS

| | | | | |
|---|---|---|---|---|
| 7,603,430 B1 * | 10/2009 | Artz, Jr. | .................. | H04L 69/28 709/224 |
| 8,205,239 B1 * | 6/2012 | Satish | .................. | H04L 63/102 726/28 |
| 8,893,278 B1 * | 11/2014 | Chechik | .................. | G06F 21/56 713/188 |
| 9,117,075 B1 * | 8/2015 | Yeh | .................. | G06F 21/567 |
| 9,413,853 B1 * | 8/2016 | Kohli | .................. | H04L 67/01 |
| 9,922,191 B1 * | 3/2018 | Grafi | .................. | G06F 21/564 |
| 2006/0212759 A1 * | 9/2006 | Campbell | .................. | G06F 11/36 714/38.14 |

(Continued)

FOREIGN PATENT DOCUMENTS

| EP | 2956884 B1 | 9/2020 |
|---|---|---|
| EP | 3528458 B1 | 9/2020 |

OTHER PUBLICATIONS

International Application Serial No. PCT/US21/55453, Search Report and Written Opinion mailed Feb. 11, 2022, 15 pgs.

(Continued)

*Primary Examiner* — Daniel B Potratz
*Assistant Examiner* — Matthias Habtegeorgis
(74) *Attorney, Agent, or Firm* — Morris, Manning & Martin, LLP; Anna Baker, Esq.

(57) ABSTRACT

Systems, methods, and devices implement security operations in security platforms implemented across web servers and application servers. Systems include a first server including one or more processors configured to identify one or more patterns of malicious activity based, at least in part, on event information associated with a request and at least one of a plurality of custom parameters, and a second server including one or more processors configured to host an application accessed by the client device, wherein the first server is coupled between the client device and the second server and is configured to handle requests between the client device and the second server. Systems also include a database system configured to store application data associated with the application and the client device.

20 Claims, 7 Drawing Sheets

(56) References Cited

U.S. PATENT DOCUMENTS

| | | | |
|---|---|---|---|
| 2006/0253579 A1* | 11/2006 | Dixon | G06Q 30/02 709/225 |
| 2013/0312097 A1* | 11/2013 | Turnbull | H04L 63/145 726/24 |
| 2017/0026345 A1* | 1/2017 | Salek | H04W 12/033 |
| 2018/0069878 A1* | 3/2018 | Martini | H04L 67/562 |
| 2018/0115576 A1* | 4/2018 | Ridley | H04L 69/16 |
| 2019/0114417 A1* | 4/2019 | Subbarayan | H04L 41/145 |
| 2019/0334940 A1* | 10/2019 | Bar Noy | H04L 43/04 |
| 2020/0076836 A1 | 3/2020 | DiValentin et al. | |
| 2020/0167464 A1 | 5/2020 | Griffin et al. | |
| 2020/0293584 A1 | 9/2020 | Holloway et al. | |

OTHER PUBLICATIONS

International Preliminary Report on Patentability, PCT Application No. PCT/US2021/055453, dated Apr. 13, 2023, 6 pages.

\* cited by examiner

SYSTEMS, METHODS, AND DEVICES FOR IMPLEMENTING SECURITY OPERATIONS IN A SECURITY PLATFORM

TECHNICAL FIELD

This disclosure generally relates to security and authentication of application servers, and more specifically, to a security platform implemented in the context of such application servers.

BACKGROUND

Applications may be executed in an online and cloud-based environment in which application servers communicate with web servers and client devices to provide the client device with application services via a communications network. Providing access to application services in such a manner may be utilized in contexts such as enterprise applications and software as a service (SaaS) platforms. Such applications may have thousands of users, each of which issuing multiple requests and incurring multiple interactions with such application servers. Accordingly, a single application may service millions of requests and events associated with such users. Conventional techniques for implementing such applications remain limited because they are not able to effectively and efficiently implement security operations dynamically and in real time for such a vast number of requests and events and in a manner that effectively and efficiently enables the prevention and reduction of the occurrence of security breaches.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Traditional logging systems offer limited logging capabilities as they typically offer logging options related to broad swaths of activity, such as errors only, warnings only, and debug events, etc. However, such options produce large amounts of data that take significant amounts of time to sort through. Accordingly, if a particular event occurs, such as a security breach, and causes a disruption in the implementation of the application, identifying the event itself as well as the cause of the event requires a significant amount of time due to the large amount of data that must be analyzed, and the result of such an analysis is typically determined well after the event has already occurred.

Furthermore, traditional systems remain limited in their ability to dynamically identified and detect patterns of malicious activity as well as implement security operations in response to such malicious activity. As discussed above, the massive amount of logged data as well as inability to dynamically analyze such logged data prevents traditional systems from being able to handle such security operations in real-time.

Systems, methods, and devices are disclosed herein that provide a security platform that enables the dynamic identification of patterns of malicious activity and implementation of corrective actions. As will be discussed in greater detail below, embodiments disclosed herein are configured to monitor user actions and application requests as well as log files associated with such actions and requests, and identify patterns of malicious activity dynamically and in real-time. Moreover, the identified patterns of malicious activity may be utilized to identify and implement corrective actions, such as security operations, responsive to the identified patterns of malicious activity. In this way, security operations may be implemented dynamically and in real-time, and across a distributed environment that may be used to implement an SaaS platform and application.

As will also be discussed in greater detail below, systems, methods, and devices may be implemented in the context of enterprise applications in which the application is hosted and served to clients via various application servers and web servers which may be implemented in clustered and distributed environments. Such applications may be implemented for numerous clients in numerous different domains and geographical locations, as may be the case for a large organization or company. Furthermore, the application itself may have many different modules or components which may operate as discrete applications implemented in separate application domains. In one example, such an application may be PeopleSoft™, which may be served to client devices situated across the globe, as may be the case for a global organization or company. Such an application may have multiple different partitions or modules, such as one for each of human capital management, workforce management, workforce service delivery, and talent management. Each module may have sub-modules or sub-applications. For example, human capital management may include sub-applications for benefits, payroll, and pension administration.

Furthermore, users of the application that interact with the application via client devices may have one or more roles within the organization. For example, a user may have a role of one of "contractor", "intern", "director", or "executive". As will be discussed in greater detail below, each role may have an associated level of access granted to it. Accordingly, each role may have designated permissions that control access to the various modules and components of the application.

Further still, each user may have a user profile that is maintained by the application in a database system. The user profile may include information such as biographical data of the user, as well as a designated user identifier (UID). In some embodiments, designated device identifiers may also be included for client devices used by the user. Furthermore, in some embodiments, previous event data or historical data may also be stored for the user.

As will be discussed in greater detail below, systems, methods, and devices disclosed herein provide improvements in the logging of such data events as well as the usage of such logged data to implement security operations within an application platform. Embodiments disclosed herein provide real-time implementation of security operations in distributed and largescale environments, and improve the efficiency with which such logged information is generated and threats are identified. In this way, systems, methods, and devices disclosed herein provide the identification and generation of corrective actions and security operations that enables efficient and real-time threat assessment and mitigation in such largescale environments.

Figure 1:
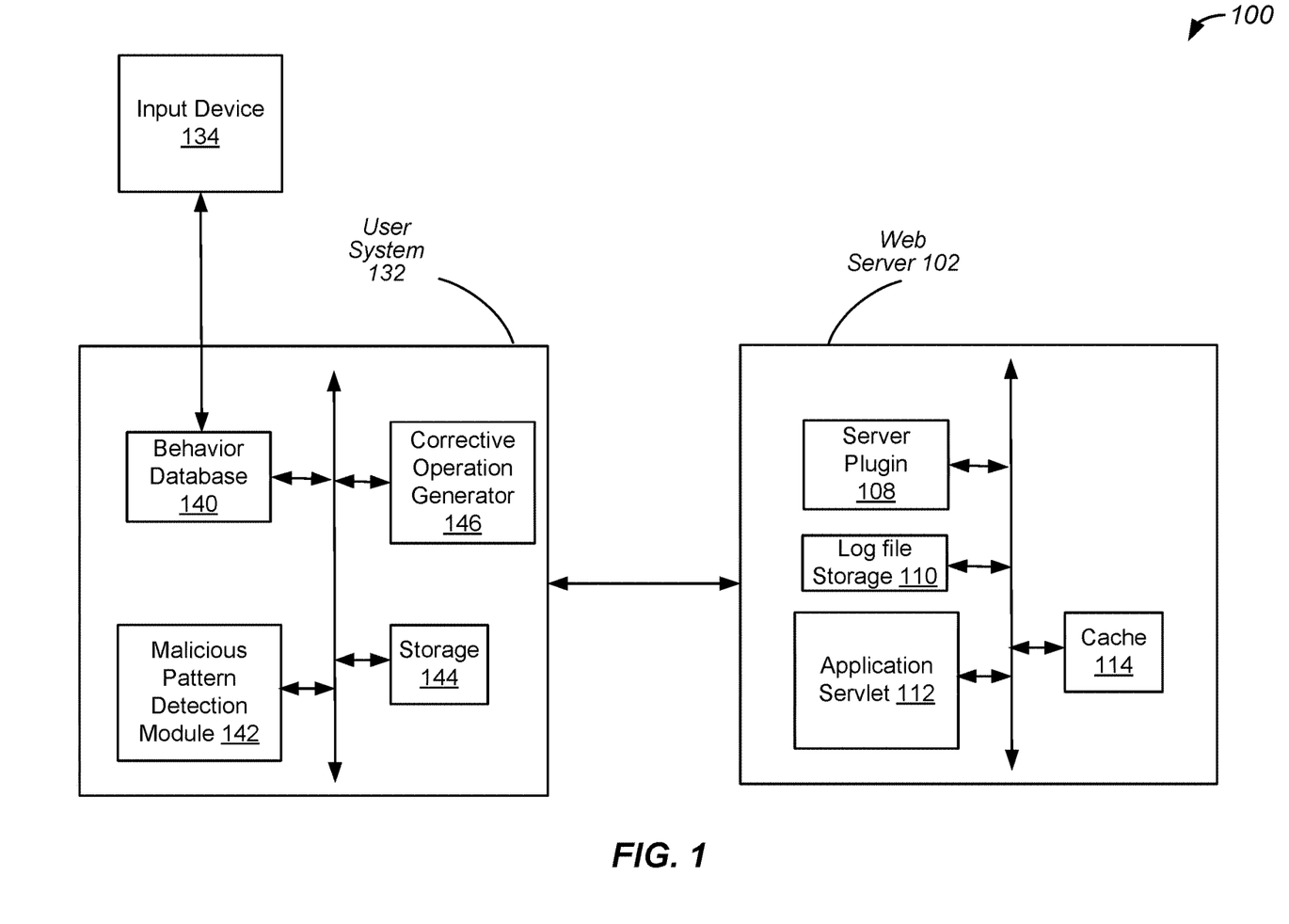
FIG. 1 illustrates an example of a system for implementing a security platform, configured in accordance with some embodiments.

FIG. 1 illustrates an example of a system for implementing a security platform, configured in accordance with some embodiments. In various embodiments, systems, such as system 100, may be implemented to provide extensive logging of data events, such as application requests, that occur within the context of a distributed computing platform that may be used to implement an SaaS application. As will be discussed in greater detail below, system 100 is also configured to utilize such log files to dynamically monitor and identify patterns of malicious behavior such that corrective actions may be implemented dynamically and in real-time thus providing enhanced security operations in a manner that is responsive to received application requests as they are received.

In various embodiments, system 100 includes input device 134 which may be a device operated by an end user. The input device may be a client machine, such as a personal computer or a mobile device such as a smartphone, and may be configured to receive one or more inputs from a user. For example, the input device may be configured to receive inputs such as keyboard strokes and mouse clicks. The input device may also include a display device configured to display a user interface screen to the user. In various embodiments, input device 134 is used to execute a portion of a cloud-based or enterprise application, such as PeopleSoft®. Accordingly, client device 132 may be configured to execute a locally installed application that communicates with one or more other components of system 100. As shown in FIG. 1, system 100 may include multiple client devices.

System 100 further includes user system 132 which is configured to facilitate communication between input device 134 and other system components, such as web server 102 discussed in greater detail below. Accordingly, user system 132 includes one or more components configured to handle requests received from input device 134, and process such requests which may be associated with an application implemented using web server 102. More specifically, user system 132 is configured to receive and monitor activity of input device 134, as well as other system components, identify malicious patterns of activity, and implement one or more security and/or corrective actions based on such monitored activity.

Accordingly, user system 132 includes malicious pattern detection module 142 which is configured to retrieve log files and identify patterns of malicious behavior based, at least in part, on the retrieved log files. As will be discussed in greater detail below, malicious pattern detection module 142 is configured to identify specific patterns of activity that may be analyzed across multiple dimensions of the log files. Thus, the patterns may be identified based on metadata of the log files, such as time stamps and geographical indicators such as IP addresses, as well as data fields of the log files themselves which may include various application and user information, such as a user ID and a user role. In some embodiments, malicious pattern detection module 142 is configured to organize logged activity into a queue, and is further configured to analyze the queue to determine if any malicious patterns are detected in the queue. Accordingly, malicious pattern detection module 142 may include a buffer specifically configured to store and maintain a queue for each observed group of log files.

User system 132 also includes behavior database 140 which is configured to store identified user behaviors and identify the presence of user behavior parameters. Accordingly, patterns identified in queues maintained by malicious pattern detection module 142 may be included in a data object, and such a data object may be incorporated into a collection of identified patterns also referred to herein as behaviors. In this way, behavior database 140 is configured to store and maintain identified malicious patterns that may be referenced based on user identifiers, user roles, metadata such as timestamps, as well as any other suitable dimension of the log files. Accordingly, the patterns stored in behavior database 140 may be quickly filtered and/or queried based on such log file dimensions and user patterns, as will be discussed in greater detail below.

User system 132 further includes corrective action generator 146. In various embodiments, corrective action generator 146 is configured to generate one or more corrective actions in response to a particular user behavior being identified. In some embodiments, the corrective action may be a security operation. For example, in response to identifying a user role mismatch or an impermissible pattern in access requests, a corrective action may be implemented that performs one or more security operations to enhance security associated with the request. More specifically, the security operation may be the denial of the request, the implementation of an additional authentication measure, such as a two-factor login, the generation of a security message to another entity, or the modification of the user's access privileges. Such corrective actions may be generated based, at least in part, on one or more rules specified by a rules engine.

In various embodiments, user system 132 additionally includes storage 144 which is a storage device configured to store data generated by behavior monitor 140, corrective action generator 146, and malicious pattern detection module 142. Storage 144 may also be configured to store and cache information received from web server 102. In some embodiments, storage 144 may be a database system or any other suitable data storage system.

System 100 further includes web server 102 which is configured to communicate with user system 132, and is also configured to handle requests received from user system 132. Accordingly, web server 102 may be configured to communicate with user system 132 via a first communications interface and a communications network, such as the internet, and may be further configured to receive requests from user system 132 and provide responses to user system 132. In various embodiments, web server 102 includes various components configured to provide services specific to a particular application, as well as generate log files associated with such an application and enable security features based on such log files. As will be discussed in greater detail below, log files may store logged events, and may be generated based, at least in part, on parameters identified by log tokens. As will also be discussed in greater detail below, log tokes may be customizable data structures that a user can configure to customize logging implemented in a system such as system 100.

Accordingly, web server 102 includes server plugin 108 which is configured to log activity and generate log files. As shown in FIG. 1, server plugin 108 may include a logging layer is implemented between the client devices, such as input device 134, and other components of web server 102 as well as downstream components, such as an application server. Server plugin 108 is configured to handle communications with user system 132, and thus is able to track and log all activity between user system 132 and web server 102, as well as between an application server and user system 132, as will be discussed in greater detail below with reference to FIG. 2. As will also be discussed in greater detail below, server plugin 108 is further configured to track and log activity between user system 132, and other components of system 100 as well. In this way, server plugin 108 has extensive access to interactions between user system 132 and other system components used to execute and run an application.

In various embodiments, server plugin 108 is configured to enable tracking and logging that is configured based, at least in part, on native properties of the application that is being hosted. Such application properties may be particular data fields on a screen or page presented to a user, a page or location within an application hierarchy, or any suitable part of an application architecture or structure. In this way, the native structure and configuration of the application hosted by an application server, discussed in greater detail below, may be used to define parameters that are tracked, configure the generation of log files, and also configure the query of such log files and/or implementation of security operations based on such log files. As will be discussed in greater detail below, server plugin 108 is configured to enable tracking and logging that is specifically configured based on a combination of such application properties as well as hardware/client device properties.

In one example, server plugin 108 is configured to enable tracking and logging associated with particular data objects of an application that is supported by application server 120. More specifically, server plugin 108 may include a logging layer that is configured to enable the tracking and logging of particular data fields of the application, and interactions with such data fields. Accordingly, specific log files may be generated based on interactions with particular data fields, as well as additional parameters used to configure the generation of the log file, such as a user and role interacting with the data field as well as one or more other conditional parameters, such as whether or not a particular page or module was access prior to the interaction with the data field.

Furthermore, the logging of application data fields can be configured and implemented independently of how they may be represented in the encoding of the data fields that is native to the application may use. For example, custom identifiers may be generated to track and log particular data field interactions. In one example, an identifier named "Purchase Order ID" may be generated and used to log data field interactions. In this example, the native application might not have such an identifier, recognize such an identifier, or support such an identifier. Moreover, the context of an application implemented in a distributed manner that may have different client devices and display screens as well as different interactions/transactions in different industries and countries, different identifiers, such as "PO_HDR_SRCH_PO_ITEM_ID" and "PO_MASTER_PO_ITEM_ID" may be used in different parts of the application/system, and the application might not have a way to reconcile the different identifiers.

Accordingly, when an application is implemented in such a distributed environment, the different identifiers used to reference a particular data field may number into the tens or even hundreds. In this example, server plugin 108 is configured to support the representation of these different identifiers, which may be native or local identifiers, as a custom identifier "Purchase Order ID", and thus enable the logging and tracking of activity associated with that data field across the various different environments and locations in which the application is implemented. Such custom identifier designations may be stored in server plugin 108, or in log file storage 110. In some embodiments, the custom identifier designations may be stored as a data object that maps the custom identifiers to the local/native identifiers. In this way, server plugin 108 is configured to handle numerous different ways of referencing a data field or data object of a distributed application, and is configured to implement logging/security operations across such a heterogenous environment. As will be discussed in greater detail below, the custom identifiers may be generated by a customer or user, or by server plugin 108.

Furthermore, server plugin 108 is configured to enable tracking and logging of the contextual environment of the application. In this way, server plugin 108 is further configured to support logging of the application environment itself. As discussed above, logging systems may allow access to environmental data such as a host name of a server and possibly operating system environment variables. However, server plugin 108 is configured to incorporate application environment information as well. Such information may include which backend application server processes a request, and which application domain is being used, as many largely distributed customers may have several application domains on a single physical server. In this way, server plugin 108 is configured to combine the tracking and logging of underlying system environmental information with application environmental information to generate an enriched set of tracked and logged environmental information.

As discussed above, the determination of types of events and information to be logged may be determined by a customer or user. In various embodiments, the determination of types of events and information to be logged may also be implemented by server plugin 108. For example, server plugin 108 may be configured to implement one or more machine learning techniques to determine types of events and information that should be logged, as well as determine when one or more actions should be taken based on such logged activity. Accordingly, server plugin 108 may be configured to identify types of log files that should be generated based on one or more environmental parameters, such as a type of application being implemented, types of users of the application, as well as a type of security concern that is to be prevented.

Moreover, server plugin 108 may be further configured to identify one or more actions to be taken based on the logged activity. For example, specific patterns of logged activity may be identified, such as an unusual number of access requests from a particular type of user to a particular type of data resource not typically associated with that type of user. In response to identifying the pattern of logged activity, server plugin 108 may determine that a particular action should be taken, such as the generation of a security notification or revocation of the user's access.

In various embodiments, training data may be utilized to train server plugin 108 to implement the determinations described above. In various embodiments, such training data may be obtained from a test system in which system parameters and operations are simulated under normal conditions as well as conditions in which one or more security-related events is occurring, such as a brute force attack or other unauthorized access. In various embodiments, the training data may be specific to the application environment, and thus may be configured to model expected behavior of users of the application as well as abnormal behavior, as may be defined by the security-related events described above which may be defined by a user or system administrator.

Web server 102 also includes log file storage 110 which is a storage location used to store the log files generated by server plugin 108. Accordingly, log file storage 110 may be a local storage device that stores such log files in a particular manner, such as indexing logged events based on client device ID, user ID, and/or application ID.

Web server 102 further includes cache 114 which may be used to cache various configuration data about the application. Accordingly, particular configuration data may be stored in cache 114 so that it is quickly accessible to components of web server 102 as well as user system 132. In various embodiments, web server 102 also includes application servlet 112 which is configured to handle network requests for a particular application. For example, application servlet 112 may be configured to handle HTTP requests associated with the application.

Figure 2:
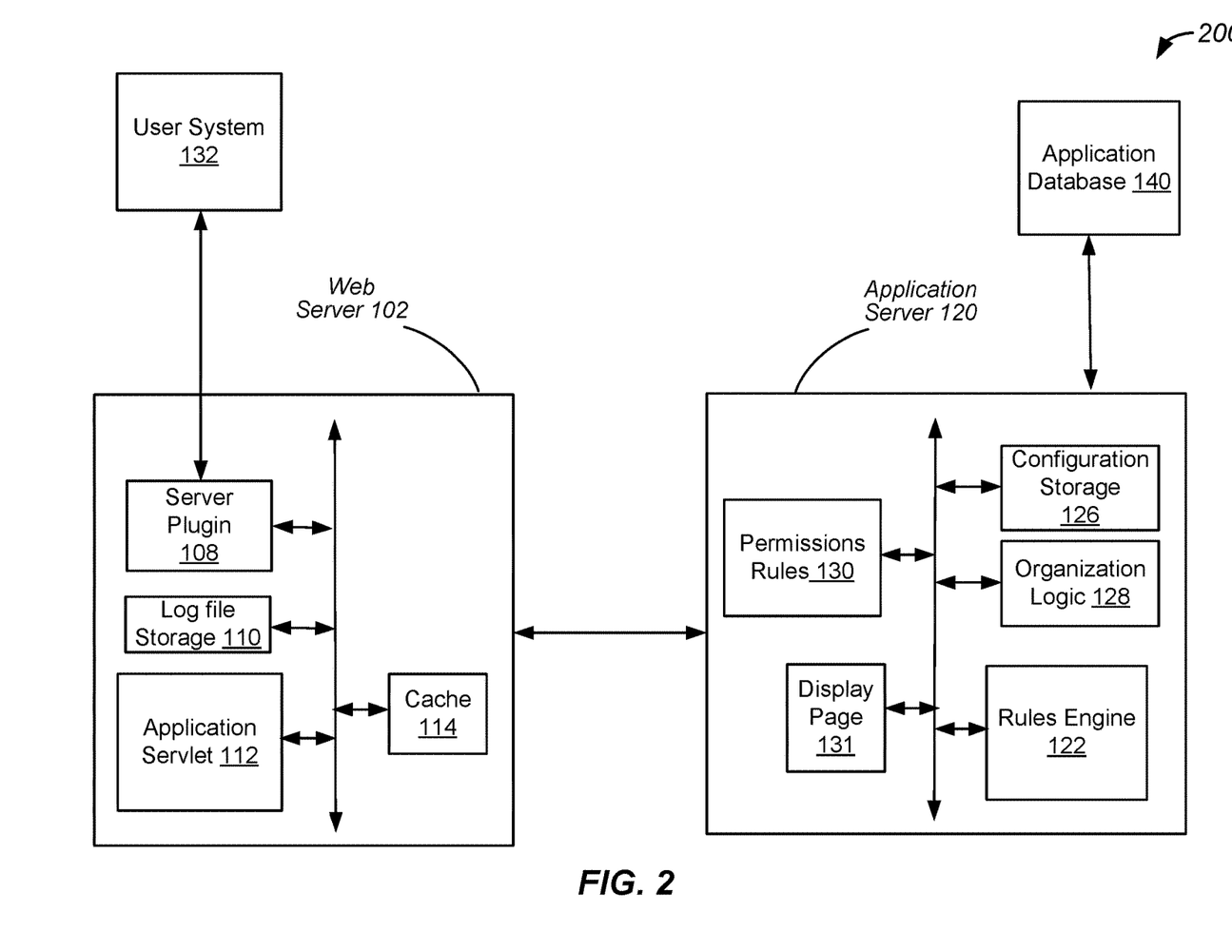
FIG. 2 illustrates another example of a system for implementing a security platform, configured in accordance with some embodiments.

FIG. 2 illustrates another example of a system for implementing a security platform, configured in accordance with some embodiments. As similarly discussed above, systems, such as system 200, include user system 132 which is communicatively coupled to web server 102. Moreover, web server 102 includes various components such as server plugin 108, log file storage 110, application servlet 112 and cache 114. As will be discussed in greater detail below, user system 132 and web server 102 are communicatively coupled to application server 120 which may be configured to host a distributed application that is part of a SaaS platform.

Accordingly, system 200 includes application server 120 which is configured to provide various services associated with the application. For example, application server 120 is configured to host components of an application, and create a server environment configured for the application. Accordingly, application server 120 is configured to run various components of an application utilized by input device 134 and user system 132 where such an application is a cloud-based application, an enterprise application, or provided as software as an SaaS application.

Application server 120 includes permissions rules engine 130 which is configured to manage and define permissions associated with the application. Accordingly, permissions rules engine 130 may be a processing device that is configured to store and maintain rules used to define classes of users, as well as permissions and access levels associated with such classes of users. Application server 120 also includes rules engine 122 which may be a processing device that is configured to store and maintain rules associated with the evaluation and storage of data. Accordingly, rules engine 122 is configured to store and maintain rules that underly the storage and retrieval of data from database 140 discussed in greater detail below.

Application server 120 further includes configuration storage 126 which is configured to store configuration data, such as that discussed above with reference to cache 114.

Application server 120 also includes display page 131 which is configured to generate web pages for display on a device or machine, such as client device 132. Accordingly, such generation of display pages may be configured based on one or more aspects of client device 132, such as a resolution or size of a display of client device 132. Application server 120 additionally includes organization logic 128 includes rules that define data objects and process flows underlying the application. Accordingly, rules underlying the processes and workflows discussed in greater detail below may be stored in organization logic 128.

System 100 further includes application database 140 which may be a database system configured to store application data for the application. Accordingly, database 140 is communicatively coupled with application server 120, and is configured to store application data which may be user data, as well as various other configuration data. In various embodiments, database 140 may be a distributed file system, a clustered storage system, or any other suitable storage system. Moreover, database 140 may be a multitenant database system that supports multiple tenants of a particular application, or multiple applications.

While various embodiments of system 100 have been discussed above, it will be appreciated that various additional embodiments are contemplated herein. For example, system 100 may include multiple client devices, multiple web servers, multiple application servers, and multiple databases. Moreover, web server 102 may be configured to support multiple different applications, and may additional instances of application servlets. In this way, system 100 may support multiple enterprise applications, and tracked and logged information may be obtained from multiple enterprise applications.

Figure 3:
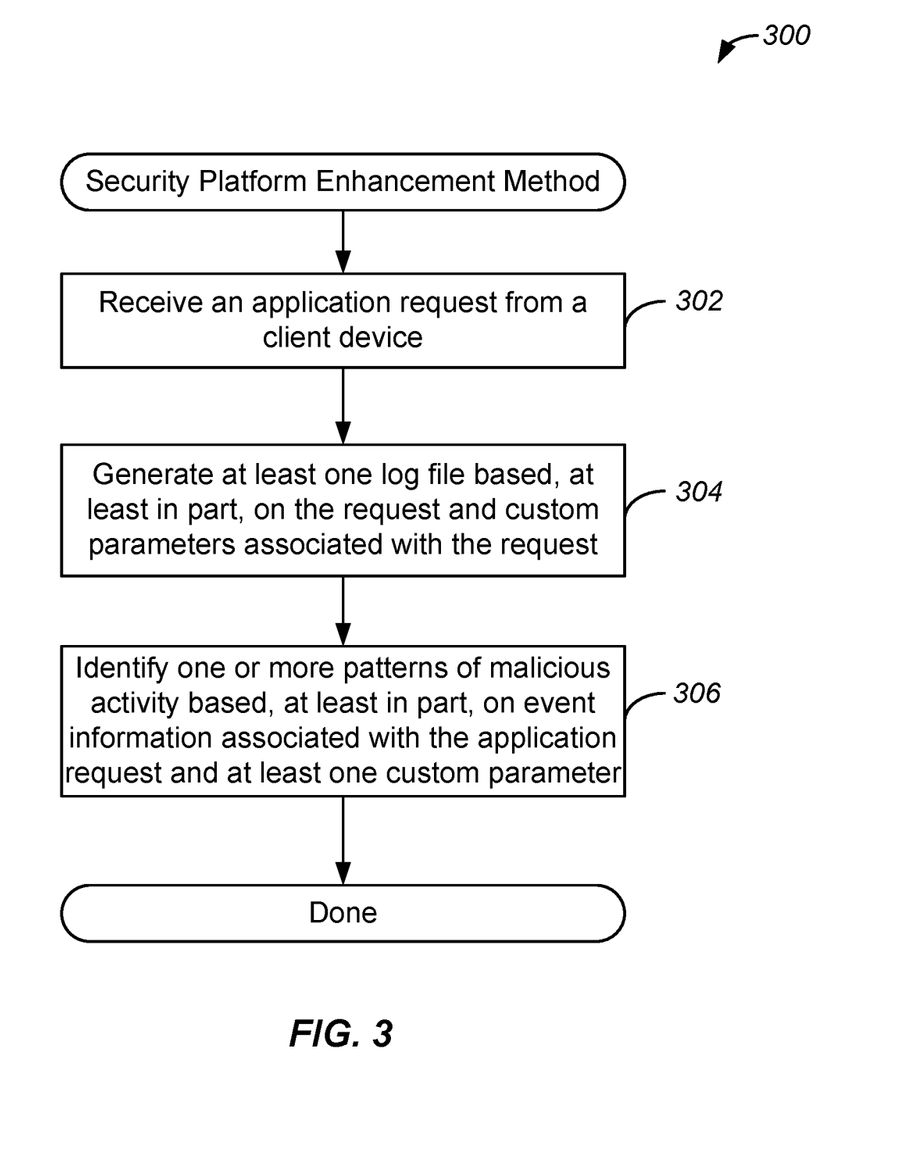
FIG. 3 illustrates an example of a flow chart of a method for implementing a security platform.

FIG. 3 illustrates an example of a flow chart of a method for implementing a security platform. As will be discussed in greater detail below, methods, such as method 300, may be implemented to dynamically identify malicious patterns of activity in real time based on received application requests as well as available log file data. Moreover, one or more corrective actions may also be implemented dynamically to enhance security associated with received requests.

Accordingly, method 300 may commence with operation 302 during which an application request may be received from a client device. As discussed above, the client device may be an input device, and may issue a request associated with an application. The application may be a distributed application implemented as part of an SaaS platform, and the request may be a request made within the context of that application, such as a login request or a data access request.

Method 300 may proceed to operation 304 during which at least one log file may be generated based, at least in part, on the request and custom parameters associated with the request. Accordingly, one or more log files may be generated that log the user's request, and the log file may include various user parameters and metadata associated with the request. The log file may be stored in a log file storage, and thus may be incorporated with various other log files.

Method 300 may proceed to operation 306 during which one or more patterns of malicious activity may be identified based, at least in part, on event information associated with the application request and at least one custom parameter. As will be discussed in greater detail below, log files and log events may be arranged into data objects that are utilized to identify and represent various different patterns of malicious activity. Accordingly, during operation 306, the information included in the log file associated with the received request may be compared against the data stored in the behavior database, and it may be determined if there is a pattern of malicious activity. As will be discussed in greater detail below, if a pattern of malicious activity is identified, corrective actions that may include security operations may be implemented to enhance security associated with the handling of the received request.

Figure 4:
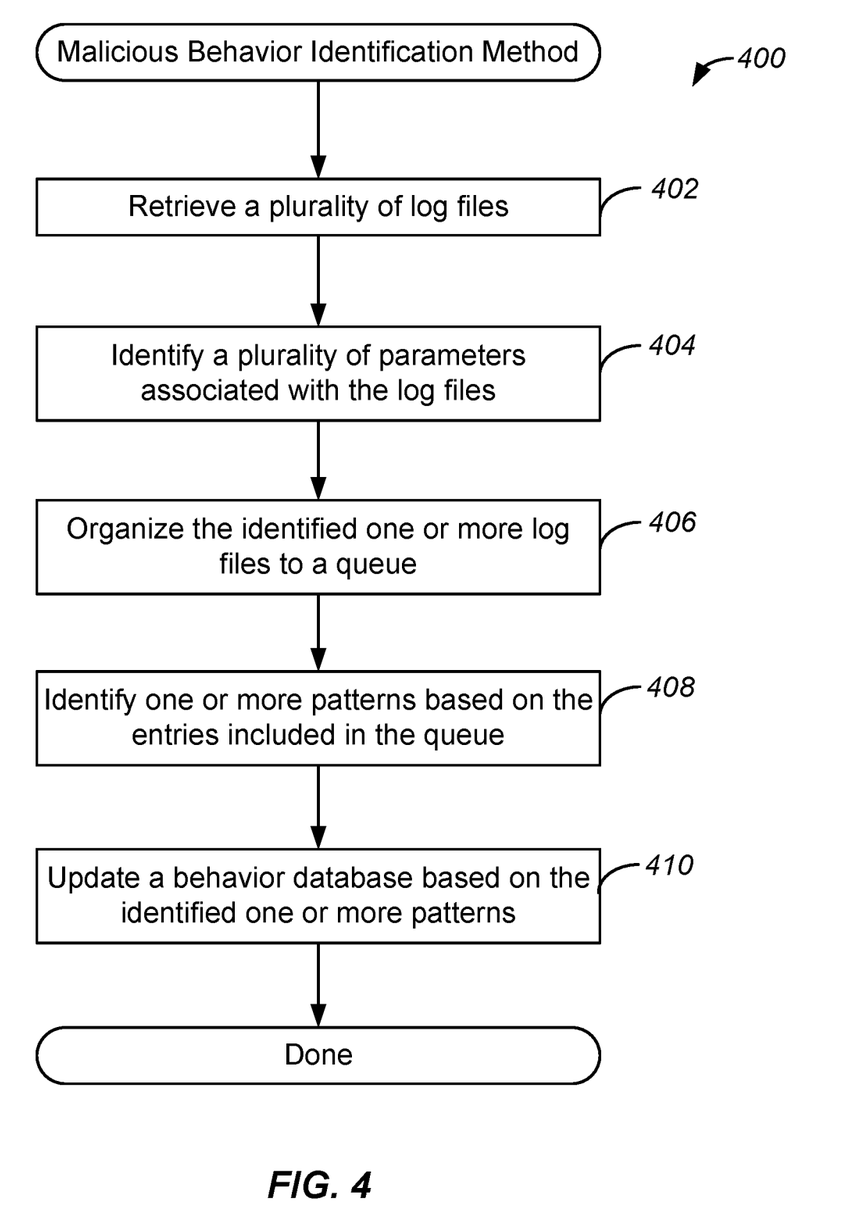
FIG. 4 illustrates an example of a flow chart of a method for identifying malicious behavior in a security platform.

FIG. 4 illustrates an example of a flow chart of a method for identifying malicious behavior in a security platform. As will be discussed in greater detail below, methods, such as method 400, may be implemented to dynamically identify malicious patterns of activity in real time based on received application requests as well as available log file data. Furthermore, the identified malicious patterns may be stored and maintained in a centralized database to build a comprehensive library of identified malicious patterns specific to a particular instance of an SaaS application.

Accordingly, method 400 may commence with operation 402 during which a plurality of log files may be retrieved. In various embodiments, the log files are generated as user actions are identified and monitored. For example, the log files may be generated dynamically, and in response to user actions such as issuing application requests. Accordingly, during operation 402, such log files may be received as they are generated.

In various embodiments, log files may be retrieved from log file storage. As discussed above, log files may be stored in a log file storage that may be maintained in one or more components, such as an application server, a web server, or a user system. Accordingly, multiple log files may be retrieved to provide contextual data for a determination of whether or not there is a pattern of malicious activity. In some embodiments, the log files may be identified based on one or more parameters, such as parameters associated with a received application request. Such parameters may include a user identifier, a device identifier, as well as associated metadata.

Method 400 may proceed to operation 404 during which a plurality of parameters associated with the log files may be identified. As noted above, the log files may have various parameters associated with them, such as user identifiers, user role data, historical and contextual data, as well as metadata associated with data events underlying the log files. During operation 404, a specific set or grouping of parameters may be identified. Such a set or grouping may represent parameters that will underly the identification of malicious patterns. Accordingly, in various embodiments, various configuration parameters may be used to identify the parameters that will underly the identification of malicious patterns. The configuration parameters may have been previously determined by an entity, such as an administrator, or may have been inferred using an application of a machine learning technique to historical data.

Method 400 may proceed to operation 406 during which the identified one or more log files may be arranged as data entries in a queue. Accordingly, log files may be placed in a queue as they are received, and such queues may be generated dynamically to provide storage locations that are specifically configured based on the previously described parameters. For example, a queue may be instantiated for a particular user during a particular period of time. In this way, queues may be instantiated for multiple sets of configuration parameters across multiple instantiations of an SaaS application. In some embodiments, the data entries in each queue may be sorted based on one or more dimensions, such as a timestamp. Moreover, the data included in the log files may be filtered and/or restructured to facilitate the identification of the patterns. In this way, data objects representing queues may be generated based on log file data, and specific to a particular pattern identification to be implemented.

Method 400 may proceed to operation 408 during which one or more patterns may be identified based on the organized entries in the queue. In various embodiments, the data entries included in the queues may be analyzed to identify the presence of one or more patterns of malicious activity. For example, the data entries may be analyzed to identify deviations in particular parameters, such as changes in IP addresses or other geographical indicators, as well as conflicts or mismatches in user roles and application data types. In this way, the data entries may be analyzed to identify one or more impermissible user actions. Such a determination may be made based on rules stored in a rules engine.

Method 400 may proceed to operation 410 during which a behavior database may be updated based on the identified one or more patterns. Accordingly, a database may be updated to include various data associated with the identified pattern. For example, data values representing particular malicious actions as well as associated data, such as log file data and metadata, may be stored in the behavior database as identified malicious actions. As will be discussed in greater detail below, the identified malicious actions may be used to identify and implement corrective actions.

Figure 5:
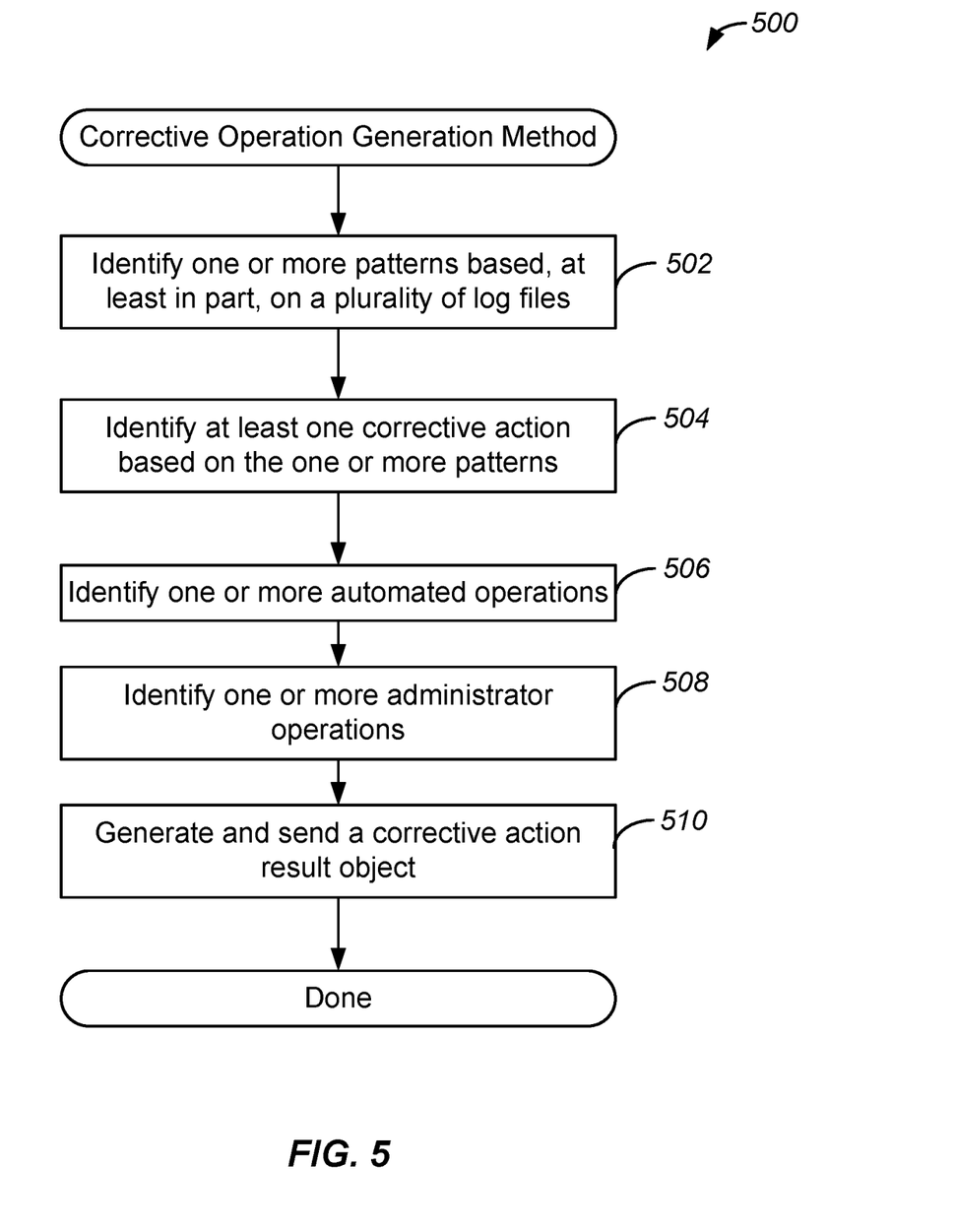
FIG. 5 illustrates an example of a flow chart of a method for generating corrective actions in a security platform.

FIG. 5 illustrates an example of a flow chart of a method for generating corrective actions in a security platform. As will be discussed in greater detail below, methods, such as method 500, may be implemented to dynamically identify and implement corrective actions based on identified malicious patterns of activity. As will also be discussed in greater detail below, the implementation of such corrective actions may be implemented automatically, semi-automatically, or manually.

Accordingly, method 500 may commence with operation 502 during which one or more patterns of activity may be identified based, at least in part, on a plurality of log files. As discussed above, log files associated with monitored user activity may be used to generate queues and identify patterns of malicious activity. Accordingly, during operation 502, a behavior database may be queries to see if any new patterns have been identified that require corrective actions. Such a determination may be made based on an indicator or flag associated with each stored behavior that indicates if it has been corrected or not.

Method 500 may proceed to operation 504 during which at least one corrective action may be identified based on the one or more patterns. Accordingly, based on the identified pattern, one or more corrective actions may be identified. In some embodiments, the corrective action may be identified based on one or more rules stored in a rules engine. Accordingly, particular types of identified patterns may be mapped to particular types of actions. For example, an identification of a geographical indicator mismatch may be mapped to a particular corrective action, such as the implementation of an additional authentication operation. During operation 504, the rules engine may be queried, and appropriate corrective actions may be identified as a result of the query.

In various embodiments corrective actions may be one of numerous different types of actions. For example, a corrective action may be a blocking action that blocks an application request. In another example, a corrective action may be a redirection action that redirects an application request. For example, an application request issued to a first system component may be redirected to a second system component that is different from the first and may have different security protocols and capabilities. In some embodiments, the corrective actions may be configured such that they have designated temporal windows or "expiration dates", and may expire after a designated period of time. In another example, the actions may be a recall of a previous action. Furthermore, it will be appreciated that multiple actions may be implemented simultaneously and in parallel. Moreover, such actions may be implemented serially and in succession such that the corrective actions may be an identified tree of actions.

Method 500 may proceed to operation 506 during which one or more automated operations may be identified. In some embodiments, the identified corrective actions may be automated operations that may be implemented automatically by a system component. Moreover, the automated operations may be additional operations associated with the previously identified corrective action. For example, multiple automated operations may underly an identified corrective action, and during operation 506, a comprehensive list of operations may be identified and generated. In some embodiments, automated operations may have been previously designated by an entity such as an administrator. Accordingly, the rules engine may be configured such that an administrator may specify some corrective actions to be implemented automatically, while others are to be implemented semi-automatically or manually.

Method 500 may proceed to operation 508 during which one or more administrator operations may be identified. As discussed above, identified actions and operations may be specified to require the intervention or action of an entity, such as an administrator. Accordingly, during operation 508, one or more such administrator operations may be identified based, at least in part, on the rules engine. As similarly discussed above, the administrator operations may be identified as operations associated with the identified corrective actions as specified by the rules engine.

Method 500 may proceed to operation 510 during which a corrective action result object may be generated and sent. Accordingly, during operation 510, one or more data objects may be generated that include at least a portion of the previously described identified corrective actions and operations. In this way, a data object may be sent to other system components to implement the identified actions and operations. In various embodiments, the data object may also be a notification or a message that is sent to an entity, such as an administrator, that provides a summary of the identified corrective actions as well as a prompt for any corrective actions that have been identified as requiring administrator action.

Figure 6:
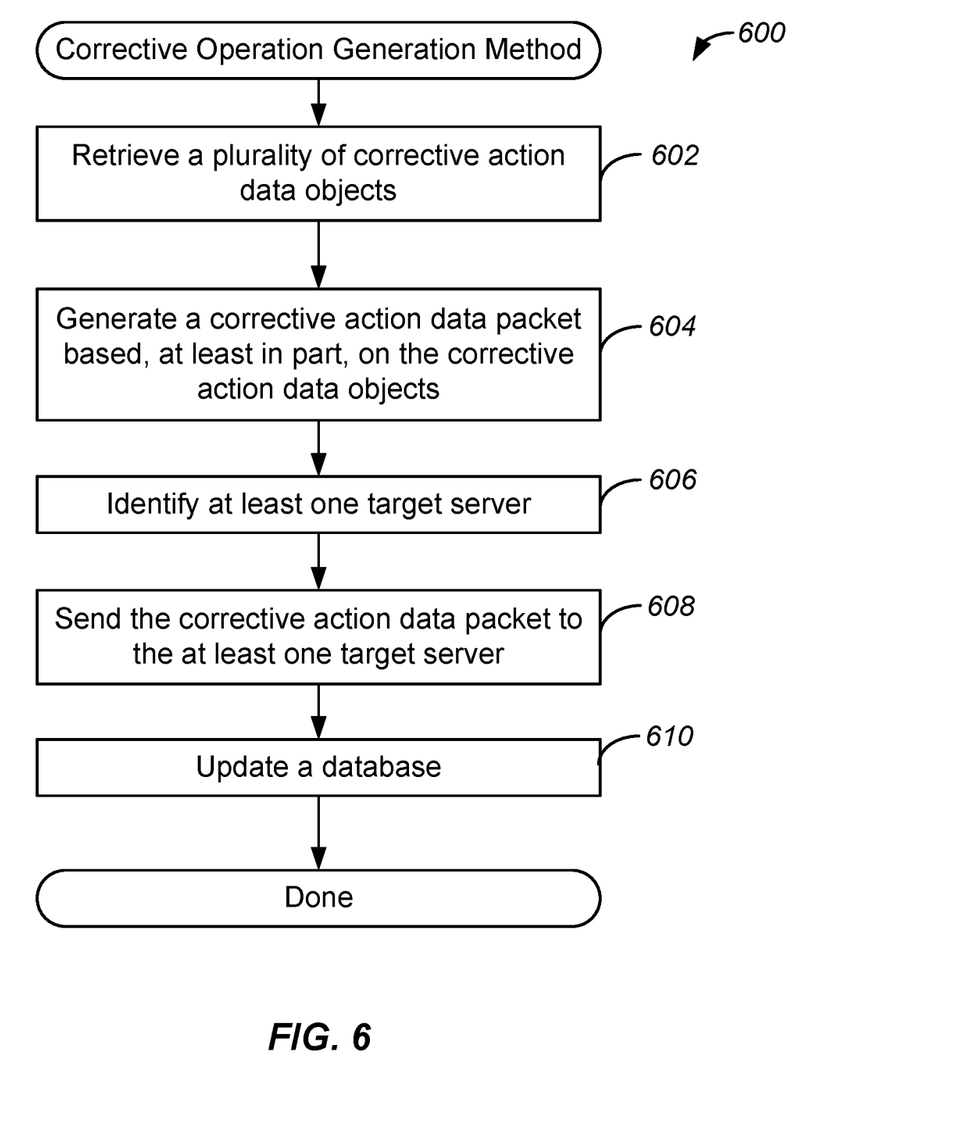
FIG. 6 illustrates another example of a flow chart of a method for generating corrective actions in a security platform.

FIG. 6 illustrates another example of a flow chart of a method for generating corrective actions in a security platform. As will be discussed in greater detail below, methods, such as method 600, may be implemented to dynamically identify and implement corrective actions based on identified malicious patterns of activity. As will also be discussed in greater detail below, the implementation of such corrective actions may be implemented in a distributed system across many instances of an SaaS application.

Accordingly, method 600 may commence with operation 602 during which a plurality of corrective action data objects may be received. As discussed above, the corrective action data objects may be corrective action result objects that were generated as the result of malicious pattern detection and corrective action identification. During operation 602, the corrective action data objects may be received dynamically as they are generated, or may be retrieved from a storage location.

Method 600 may proceed to operation 604 during which a corrective action data packet may be generated based, at least in part, on the corrective action data objects. In various embodiments, the corrective action data packet based, at least in part, on corrective action data objects that are generated as discussed above. Moreover, the corrective action data packet may be configured to include additional contextual data, such as hardware and configuration data associated with a particular instance of an SaaS application. In this way, the corrective action data packets may be augmented to include hardware and network topology information associated with an instance of the SaaS application for which the corrective actions are to be implemented.

In some embodiments, such information may be identified for multiple instances if a corrective action is to be implemented globally. Accordingly, as similarly discussed above, corrective action data packets may be generated for multiple instances of an SaaS application which may be implemented in different geographical locations, and each of the corrective action data packets may be specifically configured for the network topology of its associated instance. In this way, corrective actions may be implemented efficiently and globally.

Method 600 may proceed to operation 606 during which at least one target server may be identified. Accordingly, a target server may be identified based on the information retrieved during operation 604. More specifically, a particular corrective action may be associated with a particular target server because that particular target server is the appropriate server to implement the identified corrective action. Therefore, during operation 606, a list of target servers may be generated.

Method 600 may proceed to operation 608 during which the corrective action data packet may be sent to the target server. As discussed above, a corrective action data packet may be generated for each identified target server, and each corrective action data packet may include identified actions and operations to be implemented by that target server. In this way, implementation of the corrective actions may be compartmentalized and distributed across various components in a network topology.

Method 600 may proceed to operation 610 during which a database may be updated. Accordingly, a database may be updated to store information about the identified corrective actions and identified servers, as well as results of the implementation of the corrective actions. In this way, such data may be used for subsequent implementations of corrective actions.

Figure 7:
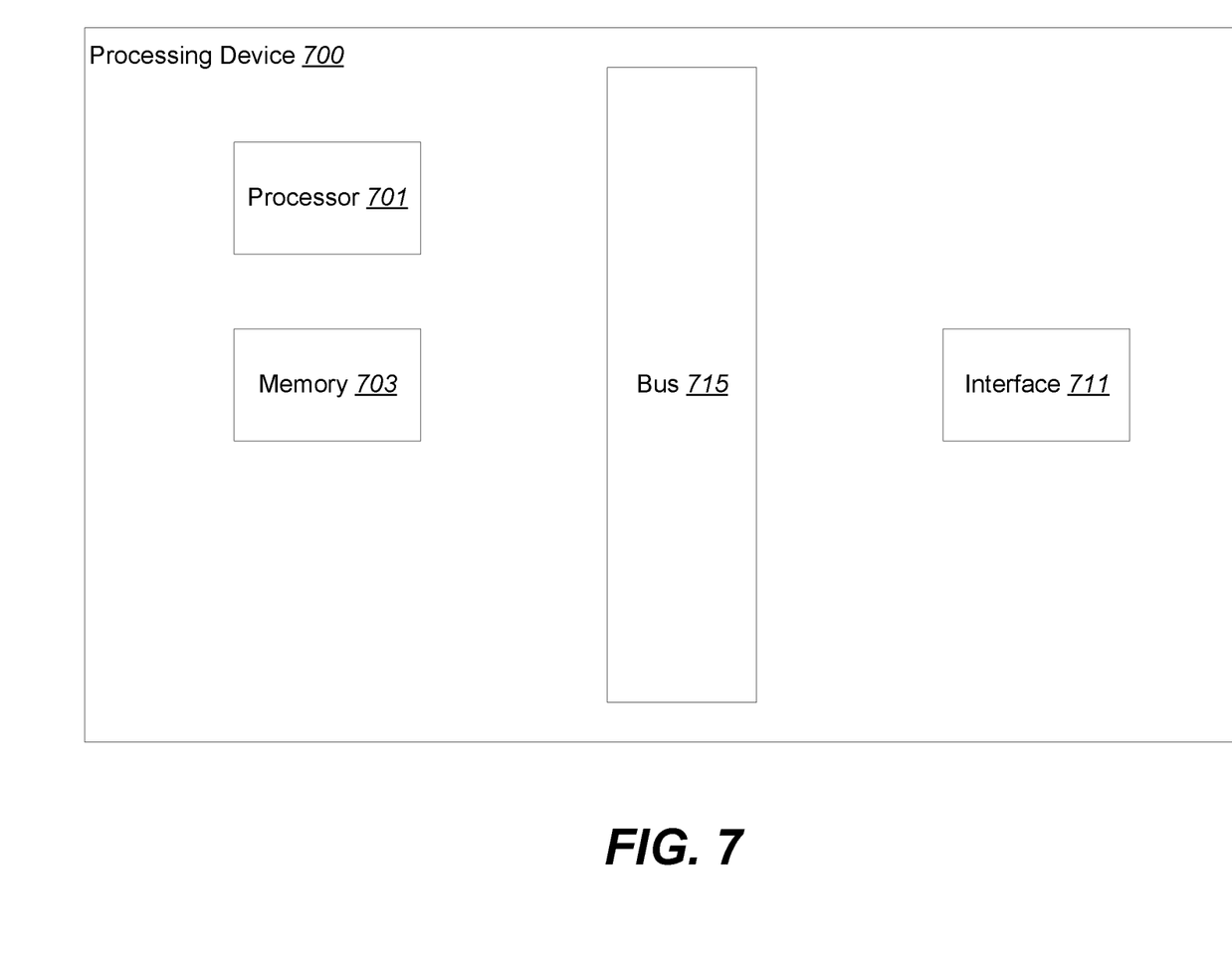
FIG. 7 illustrates an example of a processing device, configured in accordance with various embodiments.

FIG. 7 illustrates an example of a processing device, configured in accordance with various embodiments. For instance, the processing device 700 can be used to implement one or more components of servers and user systems according to various embodiments described above. In addition, the processing device 700 shown can represent a processing device on a mobile device or on a traditional computer or laptop, etc. According to particular example embodiments, a device 700 suitable for implementing particular embodiments of the present invention includes a processor 701, a memory 703, an interface 711, and a bus 715 (e.g., a PCI bus). The interface 711 may include separate input and output interfaces, or may be a unified interface supporting both operations. When acting under the control of appropriate software or firmware, the processor 701 is responsible for such tasks such as the identification and generation of malicious patterns and corrective actions. Various specially configured devices can also be used in place of a processor 701 or in addition to processor 701. The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the device 700 uses memory 703 to store data and program instructions and maintain a local side cache. The program instructions may control the operation of an operating system and/or one or more applications, for example. The memory or memories may also be configured to store received metadata.

Because such information and program instructions may be employed to implement the systems/methods described herein, the present embodiments relate to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A system comprising:
a first server comprising a first communications interface and one or more processors configured to:
receive a plurality of requests from a client device, wherein each request of the plurality of requests comprises a plurality of fields, wherein each field comprises an identifier and request data;
identify a field from the plurality of fields by applying a machine learning technique to a plurality of historical requests, plurality of historical malicious activity, and the request data;
determine that a first identifier for the field in a first request in the plurality of requests is different than a second identifier for the field in a second request in the plurality of requests; generate a mapping of the first identifier to the second identifier; perform a comparison of the plurality of requests to expected user behavior models stored in a database based on the mapping; and identify one or more patterns of malicious activity based at least on the comparison and the request data;
a second server comprising a second communications interface and one or more processors configured to host an application accessed by the client device, wherein the first server is coupled between the client device and the second server; and the database configured to store application data associated with the application and the client device and the expected user behavior models associated with the client device.

2. The system of claim 1, wherein the one or more patterns of malicious activity are identified based on patterns in the plurality of requests made by the client device.

3. The system of claim 2, wherein the one or more patterns of malicious activity are further identified based on user parameters and metadata associated with the plurality of requests.

4. The system of claim 1, wherein the first server is further configured to generate a corrective action based, at least in part, on the one or more patterns of malicious activity.

5. The system of claim 4, wherein the corrective action comprises at least one modification to a request in the plurality of requests.

6. The system of claim 1, wherein the first server is implemented as part of a user system, and wherein the second server is a web server.

7. The system of claim 1, wherein the one or more patterns of malicious activity are identified based, at least in part, on a plurality of log files based on the plurality of requests received from the client device, wherein each log file is generated based on a plurality of custom parameters.

8. The system of claim 7, wherein the plurality of custom parameters is configured to determine a plurality of data fields and a plurality of types of data values included in each log file.

9. The system of claim 8, wherein each log file of the plurality of log files comprises at least one of: a user identifier, an application identifier, a device identifier, a browser identifier, and a time stamp.

10. A method comprising:
receiving, at a first communications interface of a first server, a plurality of requests from a client device, wherein each request of the plurality of requests comprises a plurality of fields, wherein each field comprises an identifier and request data;
identifying, via one of one or more processing devices of a first server; a field from the plurality of field by applying a machine learning technique to a plurality of historical requests, plurality of historical malicious activity, and the request data;
determining, via one of the one or more processing devices of the first server, that a first identifier for the field in a first request in the plurality of requests is different than a second identifier for the field in a second request in the plurality of requests;
generating, via one of the one or more processing devices of the first server, a mapping of the first identifier to the second identifier;
performing, via one of the one or more processing devices of the first server, a comparison of the plurality of requests to expected user behavior models stored in a database based on the mapping; and
identifying, via one of the one or more processing devices of the first server, one or more patterns of malicious activity based, at least in part, on the comparison and the request data.

11. The method of claim 10, wherein the one or more patterns of malicious activity are identified based on patterns in the plurality of requests made by the client device.

12. The method of claim 11, wherein the one or more patterns of malicious activity are further identified based on user parameters and metadata associated with the plurality of requests.

13. The method of claim 10 further comprising:
generating, via the processing device of the first server, a corrective action based, at least in part, on the one or more patterns of malicious activity.

14. The method of claim 13, wherein the corrective action comprises at least one modification to a request in the plurality of requests.

15. The method of claim 10, further comprising:
generating, via one of the one or more processing devices of the first server, a plurality of log files based on the plurality of requests and a plurality of custom parameters is configured to determine a plurality of data fields and a plurality of types of data values included in each log file in the plurality of log files.

16. A device comprising:
a first communications interface communicatively coupled to a client device;
and
a processing device comprising one or more processors configured to:
receive, via the first communications interface, a plurality of requests from a client device, wherein each request of the plurality of requests comprises a plurality of fields, wherein each field comprises an identifier and request data;
identify a field from the plurality of fields by applying a machine learning technique to a plurality of historical requests, a plurality of historical malicious activity, and the request data;
determine that a first identifier for the field in a first request in the plurality of requests is different than a second identifier for the field in a second request in the plurality of requests;
generate a mapping of the first identifier to the second identifier;
perform a comparison of the plurality of requests to expected user behavior models stored in a behavior database system based on the mapping; and
identify one or more patterns of malicious activity based, at least in part, on the comparison and the request data.

17. The device of claim 16, wherein the one or more patterns of malicious activity are identified based on patterns in the plurality of requests made by the client device.

18. The device of claim 17, wherein the one or more patterns of malicious activity are further identified based on user parameters and metadata associated with the plurality of requests.

19. The device of claim 16, wherein the processing device is further configured to: generate a corrective action based, at least in part, on the one or more patterns of malicious activity.

20. The device of claim 19, wherein the corrective action comprises at least one modification to a request in the plurality of requests.

* * * * *